(12) United States Patent
Zhang

(10) Patent No.: US 11,362,563 B2
(45) Date of Patent: Jun. 14, 2022

(54) COOLING ENCLOSURE AND MOTOR

(71) Applicant: Siemens Aktiengesellschaft, Munich (DE)

(72) Inventor: Wei Zhang, TianJin (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 205 days.

(21) Appl. No.: 16/615,325

(22) PCT Filed: May 27, 2017

(86) PCT No.: PCT/CN2017/086398
§ 371 (c)(1),
(2) Date: Nov. 20, 2019

(87) PCT Pub. No.: WO2018/218452
PCT Pub. Date: Dec. 6, 2018

(65) Prior Publication Data
US 2021/0281141 A1  Sep. 9, 2021

(51) Int. Cl.
*H02K 5/20* (2006.01)
*H02K 9/06* (2006.01)
*H02K 9/18* (2006.01)

(52) U.S. Cl.
CPC .................. *H02K 5/20* (2013.01); *H02K 9/06* (2013.01); *H02K 9/18* (2013.01)

(58) Field of Classification Search
CPC ............ H02K 5/20; H02K 5/207; H02K 5/18; H02K 9/02; H02K 9/04; H02K 9/12; H02K 9/16; H02K 9/18
(Continued)

(56) References Cited

U.S. PATENT DOCUMENTS

| 4,814,653 A | 3/1989 | Hasegawa et al. |
| 2006/0055256 A1 | 3/2006 | Kreitzer |

(Continued)

FOREIGN PATENT DOCUMENTS

| CN | 1808858 A | 7/2006 |
| CN | 101048927 A | 10/2007 |

(Continued)

OTHER PUBLICATIONS

Machine translation of JP-2000245108-A. (Year: 2000).*
(Continued)

*Primary Examiner* — Michael Andrews
(74) *Attorney, Agent, or Firm* — Harness, Dickey & Pierce, P.L.C.

(57) ABSTRACT

A motor includes a cooling enclosure. The cooling enclosure includes a cover body, an inner fan, and an outer fan. A first cooling cavity, a second cooling cavity, and an isolating cavity between the first cooling cavity and the second cooling cavity are formed in the cover body. A plurality of first and second cooling pipes are respectively disposed in the first and second cooling cavity; both being in communication with the isolating cavity and the outside. The cover body includes a first surface and an opposite second surface. The inner fan is disposed on the first surface. Sides of the inner fan are respectively in communication with the first and second cooling cavities. The inner fan is configured to provide circulating power for internal circulating air. The outer fan is in communication with the isolating cavity. The cooling enclosure and the motor can realize relatively high cooling efficiency.

19 Claims, 6 Drawing Sheets

(58) Field of Classification Search
USPC .............. 310/58, 59, 30 A, 30 R, 62, 63
See application file for complete search history.

(56) References Cited

U.S. PATENT DOCUMENTS

| | | | | |
|---|---|---|---|---|
| 2008/0238224 | A1* | 10/2008 | Ressel | H02K 9/18 |
| | | | | 310/64 |
| 2011/0278969 | A1* | 11/2011 | Memminger | H02K 9/10 |
| | | | | 310/59 |
| 2012/0274159 | A1 | 11/2012 | Le Besnerais | |
| 2013/0334912 | A1 | 12/2013 | Tokunaga et al. | |
| 2017/0303436 | A1* | 10/2017 | Nyman | H02K 9/12 |
| 2018/0062483 | A1* | 3/2018 | Lang | H02K 9/12 |

FOREIGN PATENT DOCUMENTS

| | | | |
|---|---|---|---|
| CN | 201091058 | Y | 7/2008 |
| CN | 201341006 | Y | 11/2009 |
| CN | 201341066 | Y | 11/2009 |
| CN | 201466890 | U | 5/2010 |
| CN | 101997365 | A | 3/2011 |
| CN | 102265487 | A | 11/2011 |
| CN | 103081312 | A | 5/2013 |
| CN | 104296561 | A | 1/2015 |
| CN | 104303400 | A | 1/2015 |
| CN | 204131316 | U | 1/2015 |
| CN | 204652142 | U | 9/2015 |
| CN | 105226897 | A | 1/2016 |
| CN | 105356648 | A | 2/2016 |
| CN | 105515282 | A | 4/2016 |
| CN | 105684277 | A | 6/2016 |
| CN | 106451917 | A | 2/2017 |
| CN | 206195549 | U | 5/2017 |
| EP | 0301318 | A1 | 2/1989 |
| EP | 1182764 | A1 | 2/2002 |
| EP | 2512010 | A2 | 10/2012 |
| EP | 2866332 | A1 | 4/2015 |
| JP | H11122874 | A | 4/1999 |
| JP | 2000245108 | A * | 9/2000 |
| JP | 2000245108 | A | 9/2000 |
| JP | 2008086164 | A | 4/2008 |

OTHER PUBLICATIONS

Chinese Office Action dated Dec. 18, 2020.
Extended European Search Report dated Oct. 30, 2020.
International Search Report PCT/ISA/210 for International Patent Application No. PCT/CN2017/086398 dated Jan. 19, 2018.
Written Opinion of International Search Report PCT/ISA/237 for International Patent Application No. PCT/CN2017/086398 dated Jan. 19, 2018.
CA Office Action for Chinese Patent Application No. 201780088050.1 dated Jun. 24, 2021.
Office Action for Chinese Patent Application No. 201780088050.1 dated Jun. 24, 2021 and English translation thereof.

* cited by examiner

COOLING ENCLOSURE AND MOTOR

PRIORITY STATEMENT

This application is the national phase under 35 U.S.C. § 371 of PCT International Application No. PCT/CN2017/086398, which has an International filing date of May 27, 2017, which designated the United States of America, the entire contents of which are hereby incorporated herein by reference.

FIELD

Embodiments of the application generally relate to the technical field of motors, and in particular, to a cooling enclosure and a motor having the cooling enclosure.

BACKGROUND

The motors are widely applied in the field of industry, and cooling enclosures are used for cooling the interiors of the motors. FIG. 1 is a schematic diagram of a motor having a cooling enclosure of the prior art. Referring to FIG. 1, a cooling enclosure 10 includes a cover body 11, an inner fan 12, an outer fan 13, and an inner air path guide air cylinder 14, and the inner fan 12, the inner air path guide air cylinder 14, and the outer fan 13 are disposed on the cover body 11. The cover body 11 is mounted on a housing 101 of the motor 100 and is in communication with the interior of the housing 101.

A partition plate (not shown) and a plurality of cooling pipes 111 are disposed in the cover body 11. The plurality of cooling pipes 111 penetrates through the partition plate and is disposed in parallel, and the partition plate is approximately located in the middle of the cooling pipes 111. The inner fan 12 is in communication with the interior of the cover body 11, and is configured to drive air to circularly flow in the cover body 11 and in the housing 101 of the motor 100. The inner air path guide air cylinder 14 is in communication with the inner fan 12, and air blown out by the inner fan 12 passes through the cover body 11, the interior of the housing 101, and the cover body 11, and then flows toward the inner fan 12 through the inner air path guide air cylinder 14.

The outer fan 13 is in communication with the cover body 11, and is configured to pump external air into the cover body 11. After entering the cover body 11, the external air flows toward the left from the right along the cooling pipes 111 (i.e., flowing toward a driving end from a non-driving end of the motor 100) and flows out from the cooling pipes 111. The air in the cooling pipes 111 is subjected to heat exchange with internal circulating air of the motor 100, so that the internal circulating air in the motor 100 is cooled.

SUMMARY

The inventors have recognized that in the motor 100, the external air pumped by the outer fan 13 enters the cooling pipes 111 from the right side of the cooling pipes 111. To mount the outer fan 13, the length of the cover body 11 needs to be greater than the length of the housing 101, such that a part of the cooling enclosure 10 is suspended out of the housing 101 as a cantilever structure, which is unfavorable for stability of the motor. In addition, in a single circulating loop of the internal circulating air, after subjected to heat exchange with the internal circulating air of the motor 100 on the non-driving end of the motor 100, the air in the cooling pipes 111 has a higher temperature, and is then subjected to heat exchange with the internal circulating air of the motor 100 on the driving end of the motor 100, and this affects cooling efficiency of the internal circulating air.

In view of this, at least one embodiment of the present application provides a cooling enclosure and a motor, so as to realize relatively high cooling efficiency, and enhance structural stability of the motor.

At least one embodiment of the present application provides a cooling enclosure, including a cover body, an inner fan, and an outer fan, where a first cooling cavity, a second cooling cavity and an isolating cavity located between the first cooling cavity and the second cooling cavity are formed in the cover body, a plurality of first cooling pipes is disposed in the first cooling cavity, a plurality of second cooling pipes is disposed in the second cooling cavity, and the first cooling pipes and the second cooling pipes are both in communication with the isolating cavity and the outside; the cover body has a first surface and a second surface opposite to the first surface, and the second surface is configured to be mounted on a housing of a motor. The inner fan is disposed on the first surface, where one side of the inner fan is in communication with the first cooling cavity and the other side is in communication with the second cooling cavity, and the inner fan is configured to provide circulating power for internal circulating air. The outer fan is disposed on the first surface, located on the isolating cavity and in communication with the isolating cavity.

BRIEF DESCRIPTION OF THE DRAWINGS

Other characteristics, features, advantages and benefits of the present application become more obvious through detailed description with reference to the accompanying drawings.

DETAILED DESCRIPTION OF THE EXAMPLE EMBODIMENTS

Figure 1:
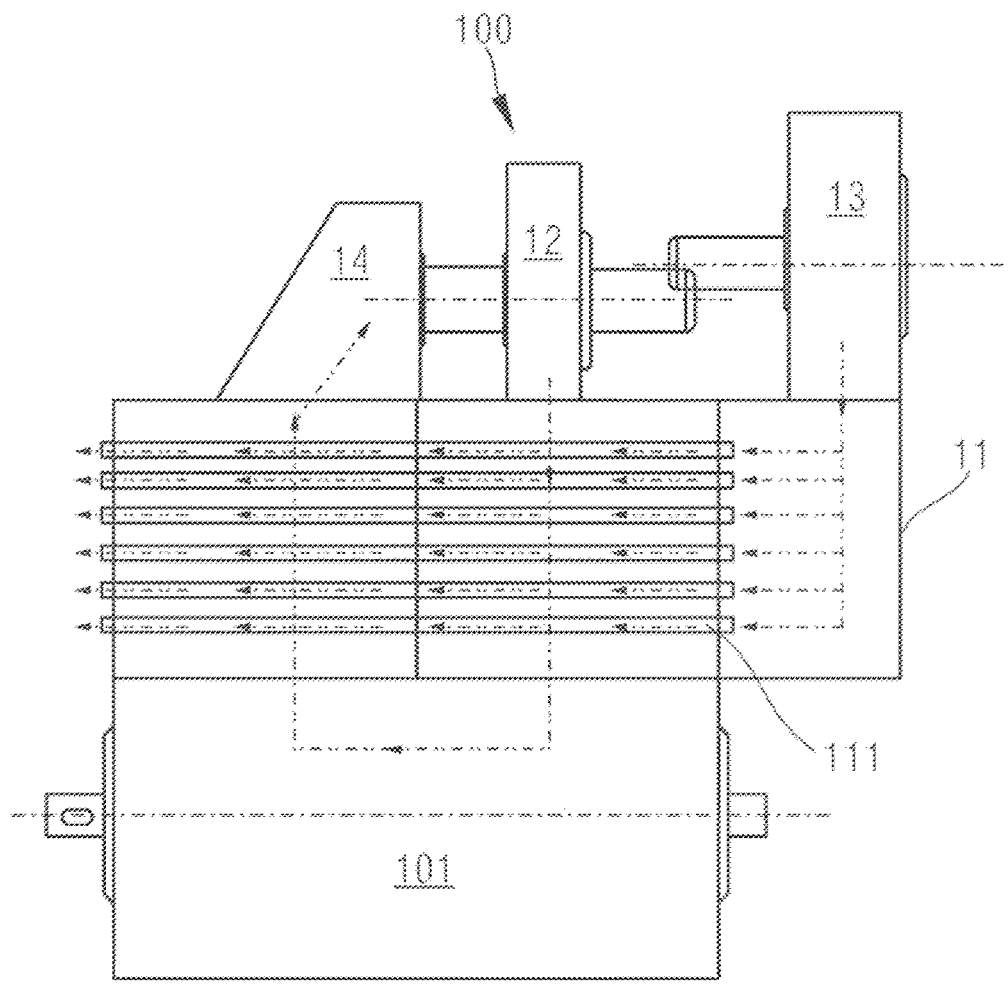
FIG. 1 is a schematic diagram of a motor having a cooling enclosure in the prior art.

At least one embodiment of the present application provides a cooling enclosure, including a cover body, an inner fan, and an outer fan, where a first cooling cavity, a second cooling cavity and an isolating cavity located between the first cooling cavity and the second cooling cavity are formed in the cover body, a plurality of first cooling pipes is disposed in the first cooling cavity, a plurality of second cooling pipes is disposed in the second cooling cavity, and the first cooling pipes and the second cooling pipes are both in communication with the isolating cavity and the outside; the cover body has a first surface and a second surface opposite to the first surface, and the second surface is configured to be mounted on a housing of a motor. The inner fan is disposed on the first surface, where one side of the inner fan is in communication with the first cooling cavity and the other side is in communication with the second cooling cavity, and the inner fan is configured to provide circulating power for internal circulating air. The outer fan is disposed on the first surface, located on the isolating cavity and in communication with the isolating cavity.

In one schematic embodiment of the cooling enclosure, the cooling enclosure further includes an inner air path guide air cylinder, located on the first surface and configured to communicate the first cooling cavity with the inner fan.

In one schematic embodiment of the cooling enclosure, the cooling enclosure further includes an inner air path guide air cylinder, located on the first surface and configured to communicate the first cooling cavity with the inner fan.

In one schematic embodiment of the cooling enclosure, the cover body is further internally provided with: a first partition plate and a second partition plate, where the first partition plate and the second partition plate are spaced to form the isolating cavity.

In one schematic embodiment of the cooling enclosure, the cover body further includes: a first enclosure net, the first cooling pipes being connected between the first enclosure net and the first partition plate; and a second enclosure net, being opposite to the first enclosure net, and the second cooling pipes being connected between the second enclosure net and the second partition plate.

In one schematic embodiment of the cooling enclosure, the inner fan and the outer fan are centrifugal fans.

The present application further provides a motor, including any cooling enclosure mentioned above.

In one schematic embodiment of the motor, the motor further includes: a housing, where the cooling enclosure is disposed on the housing and the second surface faces the housing.

In one schematic embodiment of the motor, the second surface is provided with a first air vent and a second air vent, the first air vent is in communication with the first cooling cavity and the housing, and the second air vent is in communication with the second cooling cavity and the housing.

In one schematic embodiment of the motor, the length of the cover body is equal to or slightly greater than the length of the housing.

In one schematic embodiment of the motor, the motor has a driving end and a non-driving end, which are opposite to each other, the first cooling cavity is located on the driving end, and the second cooling cavity is located on the non-driving end.

It can be seen, from at least one embodiment of the present application, that in the cooling enclosure and the motor of at least one embodiment of the present application, the first cooling cavity, the second cooling cavity and the isolating cavity are formed in the cover body of the cooling enclosure, the inner fan is in communication with the first cooling cavity and the second cooling cavity, the outer fan is located on the isolating cavity, air pumped into the isolating cavity by the outer fan may be divided into two parts to respectively flow into the first cooling pipes of the first cooling cavity and the second cooling pipes of the second cooling cavity, the air in the first cooling pipes and the second cooling pipes is separately subjected to heat exchange with internal circulating air of the motor, and the internal circulating air can be effectively cooled, so that relatively high cooling efficiency is realized. In addition, the outer fan is located on the isolating cavity, and the isolating cavity is located between the first cooling cavity and the second cooling cavity, and therefore, there is no need to dispose a cantilever structure for mounting the outer fan, and the length of the cooling enclosure may be equal to or slightly greater than the length of the housing of the motor, and this is favorable for enhancing structural stability of the motor.

To clarify the objectives, the technical solutions and the advantages of the present application, the present application is further described in detail with reference to the following embodiments.

Figure 2:
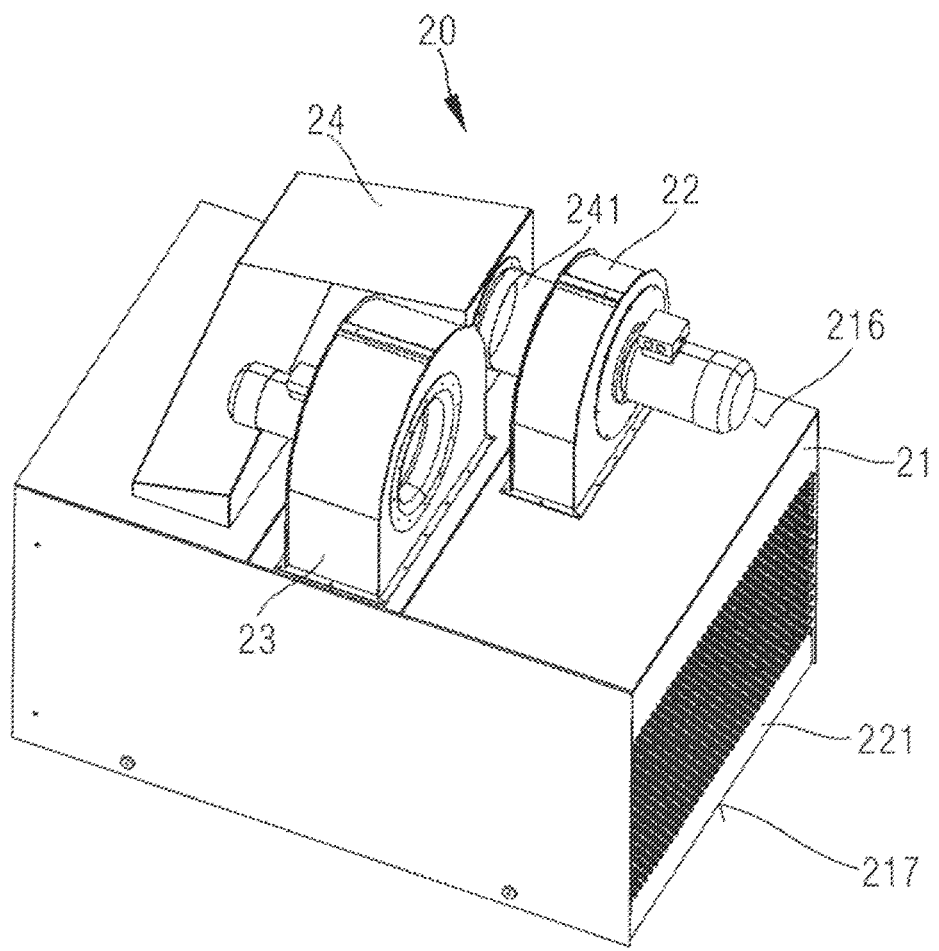
FIG. 2 is a stereoscopic schematic diagram of a cooling enclosure in one direction according to an embodiment of the present application.
Figure 3:
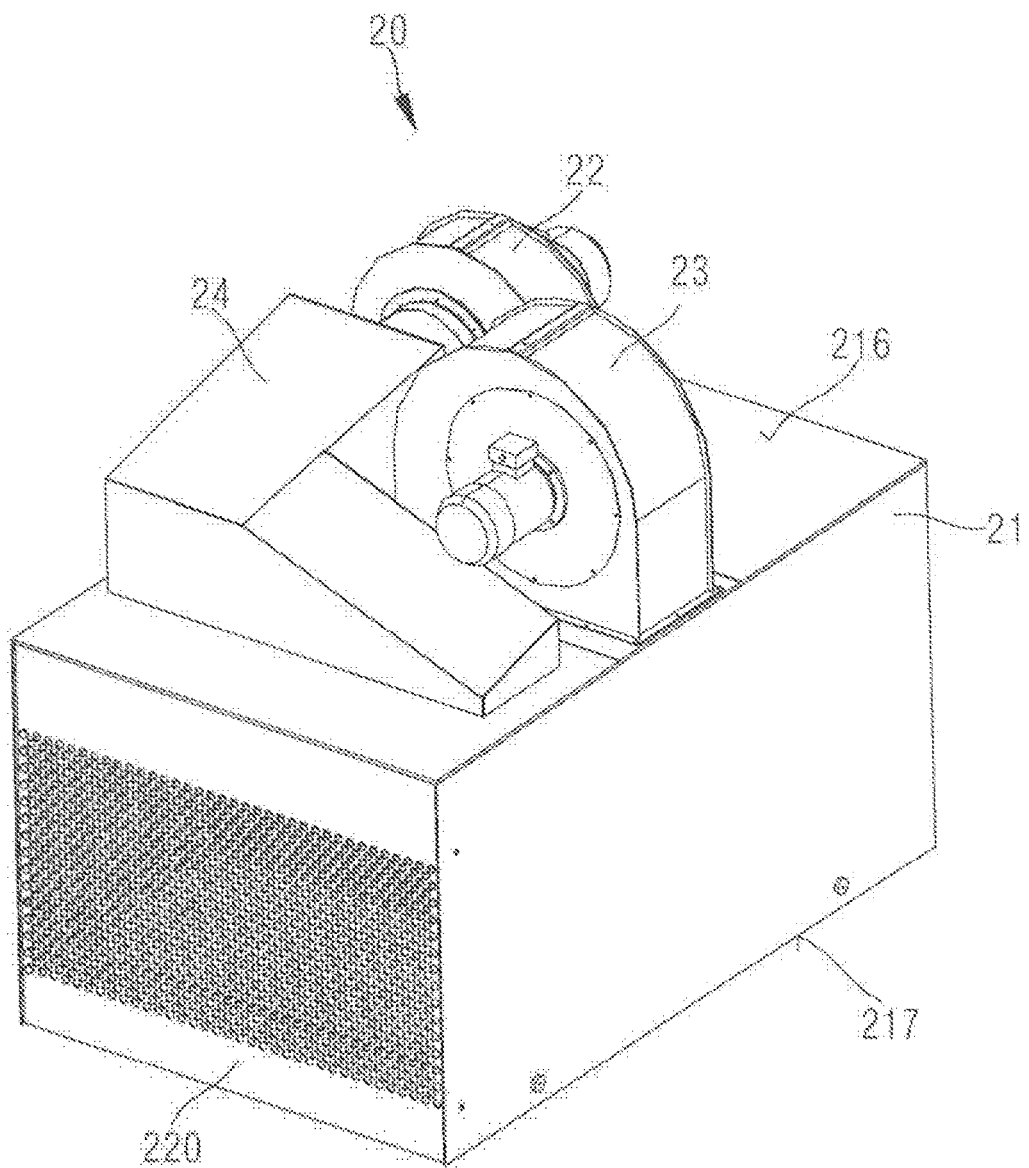
FIG. 3 is a stereoscopic schematic diagram of the cooling enclosure shown in FIG. 2 in another direction.
Figure 4:
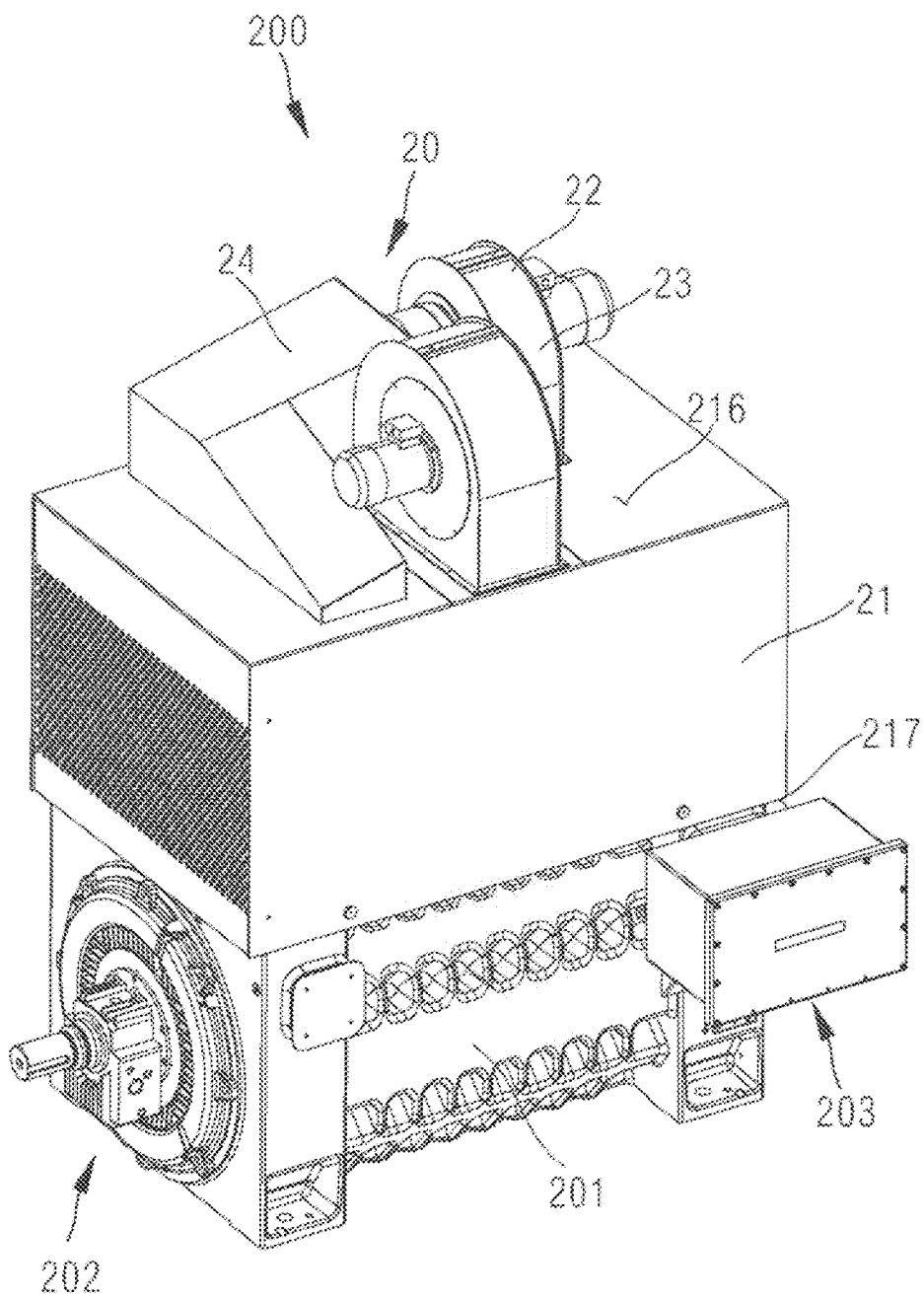
FIG. 4 is a stereoscopic schematic diagram when the cooling enclosure shown in FIG. 2 is applied to a motor.
Figure 5:
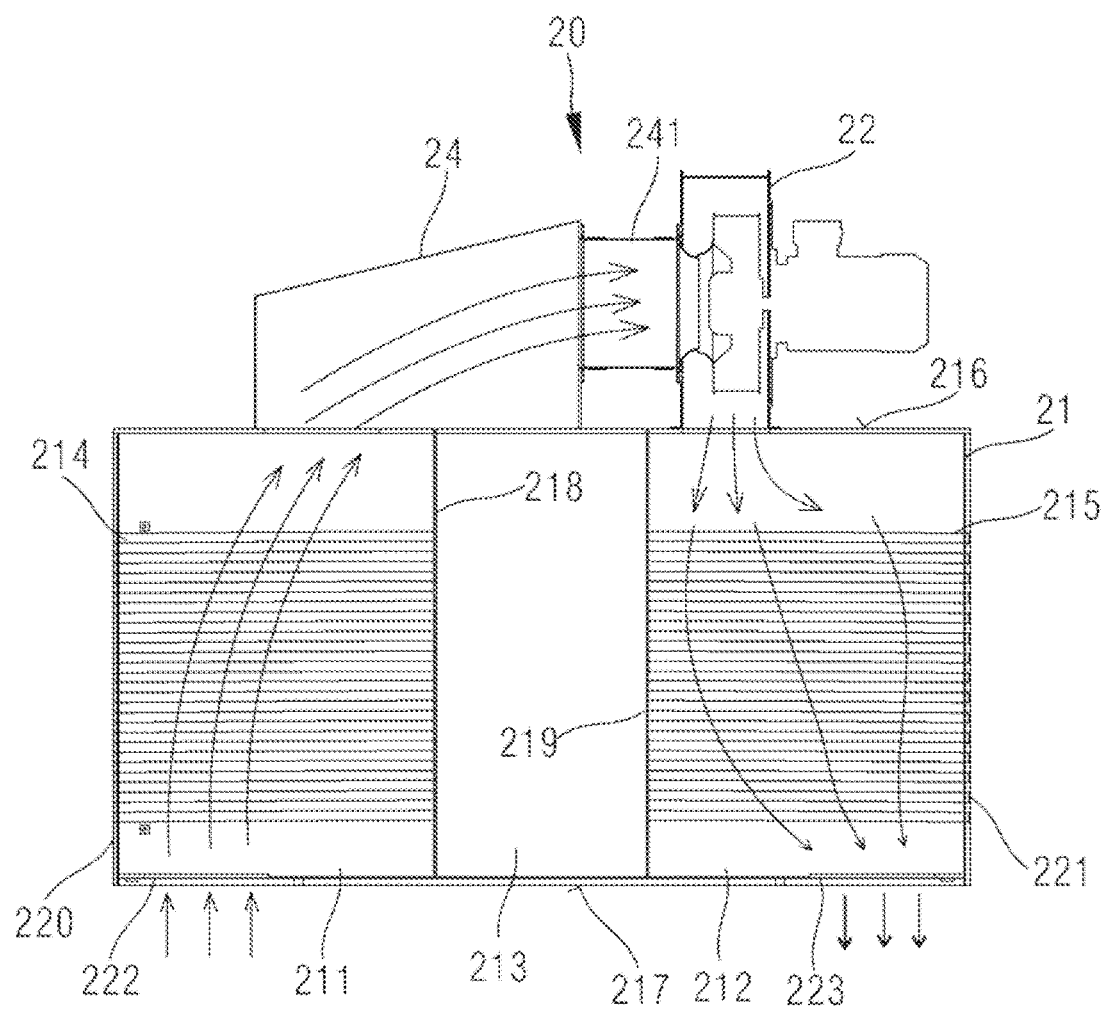
FIG. 5 is a working principle diagram of an inner air path of the cooling enclosure shown in FIG. 2.

FIG. 2 is a stereoscopic schematic diagram of a cooling enclosure in one direction according to an embodiment of the present application; FIG. 3 is a stereoscopic schematic diagram of the cooling enclosure shown in FIG. 2 in another direction; FIG. 4 is a stereoscopic schematic diagram when the cooling enclosure shown in FIG. 2 is applied to a motor. Referring to FIG. 2 to FIG. 4, a cooling enclosure 20 of this embodiment includes a cover body 21, an inner fan 22 and an outer fan 23. FIG. 5 is a working principle diagram of an inner air path of the cooling enclosure shown in FIG. 2. Referring to FIG. 5 and FIG. 2, a first cooling cavity 211, a second cooling cavity 212, and an isolating cavity 213 are formed in the cover body 21 and the isolating cavity 213 is located between the first cooling cavity 211 and the second cooling cavity 212. A plurality of first cooling pipes 214 is disposed in the first cooling cavity 211, a plurality of second cooling pipes 215 is disposed in the second cooling cavity 212, and the first cooling pipes 214 and the second cooling pipes 215 are both in communication with the isolating cavity 213 and the outside.

The cover body 21 has a first surface 216 and a second surface 217 opposite to the first surface 216, and the second surface 217 is configured to be mounted on a housing 201 of a motor 200.

The inner fan 22 is disposed on the first surface 216. One side of the inner fan 22 is in communication with the first cooling cavity 211 and the other side is in communication with the second cooling cavity 212. The inner fan 22 is configured to provide circulating power for internal circulating air.

The outer fan 23 is disposed on the first surface 216, located on the isolating cavity 213 and in communication with the isolating cavity 213.

More specifically, the cover body 21 is further internally provided with a first partition plate 218 and a second partition plate 219, and the first partition plate 218 and the second partition plate 219 are spaced to form the isolating cavity 213. The cover body 21 further includes a first enclosure net 220 and a second enclosure net 221. The second enclosure net 221 and the first enclosure net 220 are two opposite side plates of the cover body 21. The first enclosure net 220 and the second enclosure net 221 are provided with a plurality of air vents. The first cooling pipes 214 are connected between the first enclosure net 220 and the first partition plate 218. The first cooling pipes 14 are in communication with the outside through the air vents in the first enclosure net 220. The second cooling pipes 215 are connected between the second enclosure net 221 and the second partition plate 219. The second cooling pipes 215 are in communication with the outside through the air vents in the second enclosure net 221.

The inner fan 22 is disposed on the first surface 216. A through hole (not labeled) is disposed at a position, right above the second cooling cavity 212, on the first surface 216. In this embodiment, the inner fan 22 is located on the second cooling cavity 212, and the inner fan 22 is in communication with the second cooling cavity 212 through the through hole. The inner fan 22 includes a fan blade part, a cover part, and a motor. The fan blade part is disposed in the cover body.

The motor is disposed outside the cover body and configured to drive the fan blade part to rotate. The cover body enables the air pumped out by the inner fan 22 to be circulated only in the motor 200 without communication with the outside.

Figure 6:
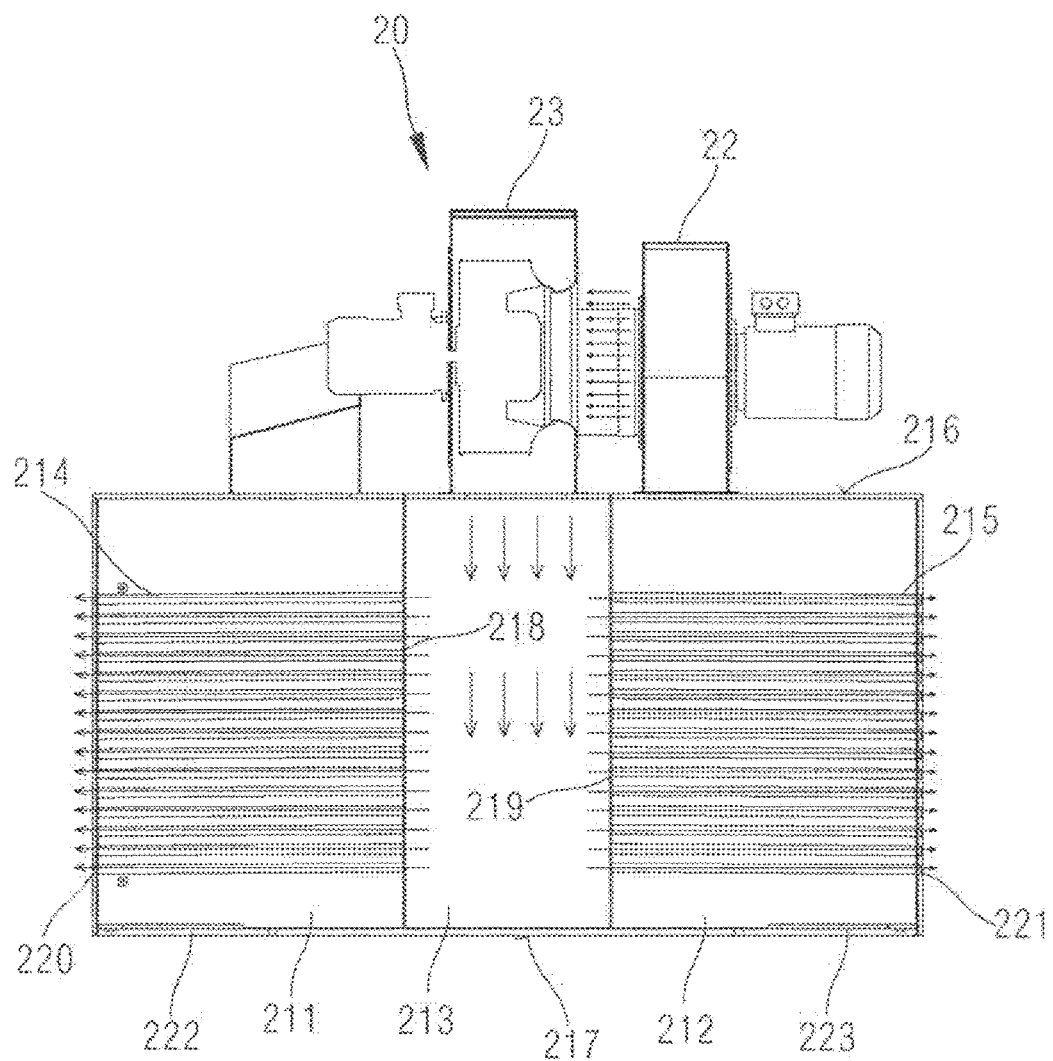
FIG. 6 is a working principle diagram of an outer air path of the cooling enclosure shown in FIG. 2.

It should be noted that one side of the inner fan 22 is in communication with the first cooling cavity 211 and the other side is in communication with the second cooling cavity 212. One side and the other side of the inner fan 22 are adjacent sides, as shown in FIG. 5. FIG. 6 is a working principle diagram of an outer air path of the cooling enclosure shown in FIG. 2. Referring to FIG. 6, the outer fan 23 is disposed on the first surface 216; a through hole is disposed at a position, right above the isolating cavity 213, on the first surface 216; and the outer fan 23 is in communication with the isolating cavity 213 through the through hole.

The outer fan 23 includes a fan blade part, an outer enclosure part, and a motor. The fan blade part is disposed in the outer enclosure part. The motor is disposed outside the outer enclosure part and configured to drive the fan blade part to rotate. The outer enclosure part is provided with meshes, and the outer fan 23 can pump external air into the isolating cavity 213. Because the isolating cavity 213 is located between the first cooling cavity 211 and the second cooling cavity 212, and the first cooling pipes 214 and the second cooling pipes 215 are both in communication with the isolating cavity 213 and the outside, air pumped into the isolating cavity 213 by the outer fan 23 may be divided into two parts, one part of the air is exhausted out of the cover body 21 from right to left along the first cooling pipes 214, and the other part of air is exhausted out of the cover body 21 from left to right along the second cooling pipes 215.

It should be noted that the inner fan 22 and the outer fan 23 are centrifugal fans. The cooling enclosure 20 further includes an inner air path guide air cylinder 24, located on the first surface 216 and configured to communicate the first cooling cavity 211 with the inner fan 22. Specifically, in this embodiment, a through hole (not labeled) is disposed at a position, right above the first cooling cavity 211, on the first surface 216, and the inner air path guide air cylinder 24 covers the through hole. The inner air path guide air cylinder 24 is connected to the cover part of the inner fan 22 by using a hose 241. In other embodiments, the positions of the inner air path guide air cylinder and the inner fan 22 are not limited to FIG. 5, and may be adjusted according to actual conditions. For example, the inner fan 22 is located on the first cooling cavity 211 and in communication with the first cooling cavity 211. In this case, the inner air path guide air cylinder 24 is connected between the inner fan 22 and the second cooling cavity 211.

Referring to FIG. 4 and FIG. 5 again, the present application further provides a motor 200. The foregoing cooling enclosure 20 may be applied to the motor 200. The motor 200 further includes a housing 201. The cooling enclosure 20 is disposed on the housing 201. The second surface 217 of the cooling enclosure 20 faces the housing 201, i.e., the second surface 217 is mounted on the housing 201, and the second surface 217 contacts the housing 201. The motor 200 has a driving end 202 and a non-driving end 203, which are opposite to each other. The first cooing cavity 211 is located on the driving end 202, and the second cooling cavity 212 is located on the non-driving end 203. The length of the cover body 21 is equal to or slightly greater than the length of the housing 201 of the motor 200.

The second surface 217 of the cooling enclosure 20 is provided with a first air vent 222 and a second air vent 223. The first air vent 222 is in communication with the first cooling cavity 211 and the housing 200 of the motor 200, and the second air vent 223 is in communication with the second cooling cavity 212 and the housing 201 of the motor 200. Internal circulating air of the motor 200 may circularly flow in the first cooling cavity 211, the second cooling cavity 212, and the housing 201.

During work, an air path of the motor 200 is divided into an outer air path and an inner air path. Refer to FIG. 6 for the outer air path. The outer fan 23 pumps external air into the isolating cavity 213 of the over body 21. The air in the isolating cavity 213 is then divided into two parts, and the two parts of air are exhausted out of the cover body 21 along the first cooling pipes 214 and the second cooling pipes 215 respectively. The air in the first cooling pipes 214 is subjected to heat exchange with the internal circulating air entering the first cooling cavity 211, and the air in the second cooling pipes 215 is subjected to heat exchange with the internal circulating air entering the second cooling cavity 212, so that the internal circulating air is effectively cooled.

Refer to FIG. 5 and FIG. 4 for the inner air path. The inner fan 22 drives the internal circulating air to flow into the housing 201 of the motor 200 from the second cooling cavity 212. The internal circulating air entering the housing 201 flows to the driving end 202 from the non-driving end 203 of the motor 200. After cooling a stator iron core and a rotor iron core in the motor 200, the internal circulating air flows through the first cooling cavity 211, is cooled by the first cooling pipes 214, then flows out of the first cooling cavity 211, flows through the inner air path guide air cylinder 24 and the hose 241, is then pumped into the second cooling cavity 212 by the inner fan 22, is cooled by the second cooling pipes 215 and then flows into the housing 201, and this cycle is repeated.

It should be noted that the cooling enclosure 20 may be an IC666 cooling enclosure, but the model of the cooling enclosure 20 is not limited thereto, and the size of the cooling enclosure 20 may be freely adjusted according to actual needs. The motor 200 may be cooled in a manner of axial-radial mixed ventilation. In other words, the internal circulating air is divided into a plurality of paths in the housing 201 of the motor 200 and axially and radially flows along the housing 201, so as to cool the stator iron core and the rotor iron core in the motor 200.

The cooling enclosure and the motor of at least one embodiment of the present application have at least the following advantages:

1. In the cooling enclosure and the motor of the present application, the first cooling cavity, the second cooling cavity and the isolating cavity are formed in the cover body of the cooling enclosure, the inner fan is in communication with the first cooling cavity and the second cooling cavity, the outer fan is located on the isolating cavity, air pumped into the isolating cavity by the outer fan may be divided into two parts to respectively flow into the first cooling pipes of the first cooling cavity and the second cooling pipes of the second cooling cavity, the air in the first cooling pipes and the second cooling pipes is separately subjected to heat exchange with internal circulating air of the motor, and the internal circulating air can be effectively cooled, so that relatively high cooling efficiency is realized. In addition, the outer fan is located on the isolating cavity, and the isolating cavity is located between the first cooling cavity and the second cooling cavity, and therefore, there is no need to dispose a cantilever structure for mounting the outer fan, and the length of the cooling enclosure may be equal to or slightly greater than the length of the housing of the motor, and this is favorable for enhancing structural stability of the motor.

2. In one embodiment of the cooling enclosure and the motor of the present application, the first partition plate and the second partition plate are further disposed in the cover body of the cooling enclosure and are spaced to form the isolating cavity; the air pumped into the isolating cavity by the outer fan may be divided in the isolating cavity, and efficiency of the heat exchange between the air flowing into the first cooling pipes and the second cooling pipes and the internal circulating air of the motor is relatively high. The isolating cavity isolates the first cooling cavity from the second cooling cavity, so that the heat exchange between the internal circulating air in the first cooling cavity and the internal circulating air in the second cooling cavity can be effectively prevented, and this facilitates improving cooling performance of the motor.

3. In one embodiment of the cooling enclosure and the motor of the present application, the cooling enclosure further includes the inner air path guide air cylinder, configured to communicate the first cooling cavity with the inner fan, so that the internal circulating air of the motor can smoothly flow to the inner fan.

4. In one embodiment of the cooling enclosure and the motor of the present application, the inner air path guide air cylinder is connected to the cover part of the inner fan by using the hose, and because of the use of the hose, the inner fan and the inner air path guide air cylinder can be mounted at proper positions conveniently.

5. In one embodiment of the cooling enclosure and the motor of the present application, because the cooling enclosure does not need to be provided with the cantilever structure, the length of the cooling enclosure is reduced, and the weight of the cooling enclosure is reduced, thereby facilitating reducing the cost.

6. In one embodiment of the cooling enclosure and the motor of the present application, the first cooling pipes and the second cooling pipes are isolated by the isolating cavity, so that the length of the cooling pipes is reduced and the weight and the cost of the cooling enclosure are further reduced.

The foregoing is merely preferred embodiments of the present application, and is not intended to limit the present invention, and any modification, equivalent substitution, improvement, etc., made within the spirit and principle of the present invention should fall within the protective scope of the present invention.

What is claimed is:

1. A cooling enclosure, comprising:
a cover body, the cover body internally including
a first cooling cavity, a plurality of first cooling pipes being disposed in the first cooling cavity,
a second cooling cavity, a plurality of second cooling pipes being disposed in the second cooling cavity, and
an isolating cavity, located between the first cooling cavity and the second cooling cavity, the first cooling pipes and the second cooling pipes both being in communication with the isolating cavity and outside the cooling enclosure, the cover body further including
a first surface, and
a second surface, the second surface being opposite to the first surface and configured to be mounted on a housing of a motor;
an inner fan, disposed on the first surface, one side of the inner fan being in communication with the first cooling cavity and another side of the inner fan being in communication with the second cooling cavity, the inner fan being configured to provide circulating power for internal circulating air; and
an outer fan, disposed on the first surface, located on the isolating cavity and in communication with the isolating cavity, wherein
the second surface of the cooling enclosure includes a first air vent in communication with the first cooling cavity and the housing of the motor and a second air vent in communication with the second cooling cavity and the housing of the motor,
the isolating cavity is not in communication with the housing of the motor, and
a width of the isolating cavity along a direction parallel with the first cooling pipes and the second cooling pipes is constant.

2. The cooling enclosure of claim 1, further comprising:
an inner air path guide air cylinder, located on the first surface, the inner fan being located on the second cooling cavity and the inner air path guide air cylinder being configured to communicate the first cooling cavity with the inner fan.

3. The cooling enclosure of claim 2, wherein the cover body further internally includes:
a first partition plate; and
a second partition plate, the first partition plate and the second partition plate being spaced to form the isolating cavity.

4. The cooling enclosure of claim 3, wherein the cover body further comprises:
a first enclosure net, the first cooling pipes being connected between the first enclosure net and the first partition plate; and
a second enclosure net, disposed opposite to the first enclosure net, the second cooling pipes being connected between the second enclosure net and the second partition plate.

5. The cooling enclosure of claim 2, wherein the inner fan and the outer fan are centrifugal fans.

6. A motor, comprising the cooling enclosure of claim 2, the cooling enclosure being connected to the motor.

7. The cooling enclosure of claim 2, further comprising:
a housing, wherein the cooling enclosure is disposed on the housing and the second surface faces the housing.

8. The cooling enclosure of claim 1, wherein the cover body further internally includes:
a first partition plate; and
a second partition plate, the first partition plate and the second partition plate being spaced to form the isolating cavity.

9. The cooling enclosure of claim 8, wherein the cover body further comprises:
a first enclosure net, the first cooling pipes being connected between the first enclosure net and the first partition plate; and
a second enclosure net, disposed opposite to the first enclosure net, the second cooling pipes being connected between the second enclosure net and the second partition plate.

10. A motor, comprising the cooling enclosure of claim 9, the cooling enclosure being connected to the motor.

11. A motor, comprising the cooling enclosure of claim 8, the cooling enclosure being connected to the motor.

12. The cooling enclosure of claim 8, further comprising:
a housing, wherein the cooling enclosure is disposed on the housing and the second surface faces the housing.

13. The cooling enclosure of claim 1, wherein the inner fan and the outer fan are centrifugal fans.

14. A motor, comprising the cooling enclosure of claim 13, the cooling enclosure being connected to the motor.

15. A motor, comprising the cooling enclosure of claim 1, the cooling enclosure being connected to the motor.

16. The motor of claim 15, further comprising:
a housing, wherein the cooling enclosure is disposed on the housing and the second surface faces the housing.

17. The motor of claim 16, wherein the second surface is provided with a first air vent and a second air vent, the first air vent being in communication with the first cooling cavity and the housing, and the second air vent being in communication with the second cooling cavity and the housing.

18. The motor of claim 17, wherein the motor includes a driving end and a non-driving end, the non-driving end being opposite to the driving end, the first cooling cavity being located on the driving end, and the second cooling cavity being located on the non-driving end.

19. The motor of claim 16, wherein a length of the cover body is equal to or slightly greater than a length of the housing.

\* \* \* \* \*